Aug. 13, 1963 K. BREER 3,100,506
APPARATUS FOR THE MANUFACTURE OF PLASTICS
Filed Jan. 23, 1962 2 Sheets-Sheet 1

INVENTOR.
Karl Breer
BY
Burgess, Dinklage & Sprung
ATTORNEY

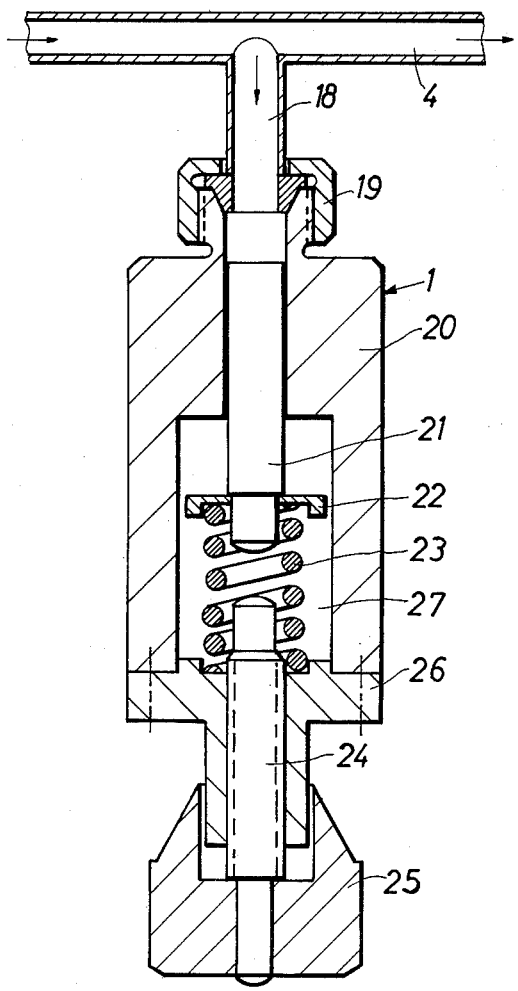

3,100,506
APPARATUS FOR THE MANUFACTURE OF PLASTICS
Karl Breer, Cologne-Flittard, Germany, assignor to Farbenfabriken Bayer Aktiengesellschaft, Leverkusen, Germany, a corporation of Germany
Filed Jan. 23, 1962, Ser. No. 168,191
Claims priority, application Germany Feb. 3, 1961
1 Claim. (Cl. 137—567)

The invention relates to an apparatus for the manufacture of plastics, e.g. foam substances containing urethane groups, from separate components. The apparatus consists of high pressure pumps which are connected through conveyor pipes to injection nozzles opening into a common mixing chamber.

By means of this apparatus, the components which are to be mixed enter into the mixing chamber completely synchronously, preferably with all the injection nozzles at the same opening pressures. This is achieved, according to the invention, by connecting to at least one pipe a liquid reservoir consisting of a piston which has a spring attachment at an end and which is freely movable in a bore of a housing; an adjustable stop bolt is provided in the longitudinal axis of the piston, at the end near the spring and at some distance from the end of the piston.

By means of such an arrangement, the differences in volume in the different conveyor pipes (which are often considerable and which are determined by the type and quantities of the different reaction components), may be compensated when the mixing apparatus is started. This ensures that the doses are supplied in quantities exactly in accordance with a recipe when the mixing apparatus is first set into action (i.e. when the working pressures of the components are being built up), for (i) any desired component ratios, (ii) any differences in viscosity and compressibility of the reaction components, (iii) all rates of discharge from the mixing chamber, and (iv) for varying volumes in the conveyor pipes and output tolerances.

The practical requirement is thereby also met that the nozzles, opening into mixing chamber for the counter-current injection of the injection components, are pretensioned to substantially the same aperture pressure (e.g. 100 atmospheres above atmospheric pressure). Thus, when the nozzles are opened simultaneously into the mixing chamber, the required working pressure for desired counter-current injection of the reaction components (which are supplied in quantitatively exact doses) may be obtained, and in the event of the nozzles having to be replaced during repair there is no possibility of the nozzles getting mixed up.

If, on starting to use the apparatus, volume differences occur in the pipes, which have the pumps at one end and the pretensioned injection nozzles at the other, then the excess liquid will press against the piston in the storage housing and push it to the stop bolt. The position of the stop bolt may be adjusted precisely to effect the correct compensation in volume, for example by means of a micrometer screw.

When the mixing process is stopped, i.e. during the reduction of working pressure in the pipes, the pistons are pushed back to their starting positions by the force of the springs attached to them, and the stored liquid is thereby returned for recycling.

The invention will now be particularly described with reference to the drawings.

FIGURE 2 shows a reservoir device connected to a pipe for one reaction component.

Figure 1:
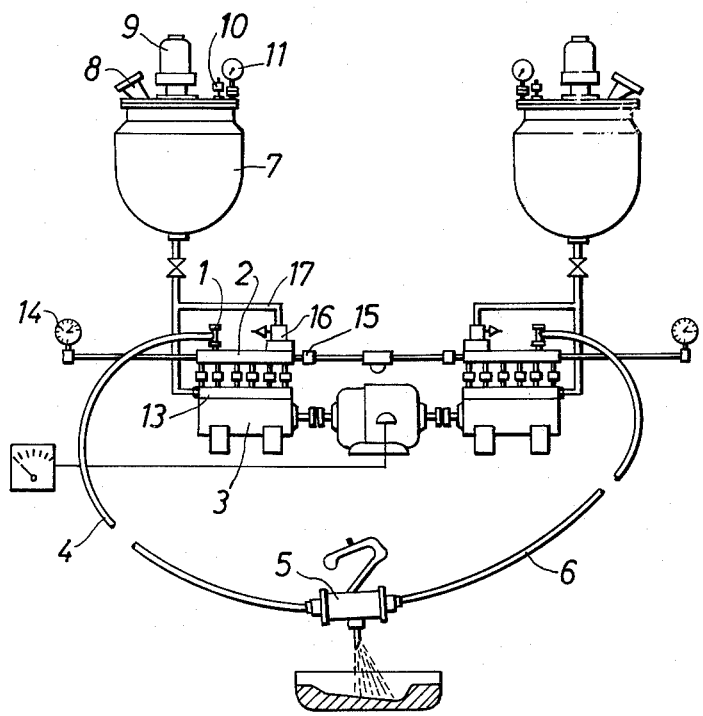
FIGURE 1 shows an entire assembly for manufacturing a plastics material.

A liquid reservoir 1 is connected directly behind a collecting block 2 of a piston pump 3. The reservoir 1 leads to a conveyor pipe 4 and thus to a portable mixing apparatus 5 in which a first component conveyed in the pipe 4 is mixed with a second injection component conveyed in tubing 6. The first component is pressed from a container 7, which is equipped with a feed opening 8, stirrer 9, pressure air valve 10 and manometer 11 by way of an inlet pipe 12 into a suction chamber 13 of the piston pump 3. The collecting block 2 of the piston pump is provided with a manometer 14 and a safety valve 15. An adjustable release valve 16, which is adjusted to the "closed" position during the mixing process, is automatically opened when the apparatus is stopped, and releases the conveyor pipe 4, the collecting block 2 of the pump, and the reservoir piston 1, the excess pressure in these machine elements dropping suddenly through by-pass duct 17 to the pressure in 7 and 12, which is the preliminary pressure of the container. The stored volume in the reservoir piston 1, which is utilized when the machine is started, is returned to the reservoir when the release valve is opened, so that a stored volume is again available for the apparatus when the latter is started again.

As shown in FIGURE 2, a connecting piece 18 of the pressure pipe 4 is connected by means of a collar nut 19 with a housing 20 of the reservoir piston, which housing contains a piston 21 with a spring rest 22, compression spring 23 and stop bolt 24. When the mixing apparatus is set into action, the stop bolt 24 adjusts (by means of a micrometer screw 25 which engages over cover 26 of the housing), the path of the piston 21, thus determining the desired increase in volume in the conveyor pipe 4.

I claim:

Apparatus for the manufacture of plastics, e.g. of foam substances containing urethane groups, from separate components, which comprises high pressure pumps connected through conveyor pipes to injection nozzles opening into a common mixing chamber wherein, to at least one pipe 4 there is connected a liquid reservoir which consists of a piston 21 arranged to be freely movable in the bore of a housing and which has a spring attached at one end, and wherein a stop bolt 24 is provided in the longitudinal axis of said piston at the end near the spring 23 and disposed at some ditsance from the end of the piston.

References Cited in the file of this patent

UNITED STATES PATENTS

| | | |
|---|---|---|
| 2,742,978 | Peterson | Apr. 24, 1956 |
| 3,017,057 | Reed | Jan. 16, 1962 |

FOREIGN PATENTS

| | | |
|---|---|---|
| 1,085,114 | France | July 21, 1954 |